US012638568B2

(12) United States Patent
Harada et al.

(10) Patent No.: US 12,638,568 B2
(45) Date of Patent: May 26, 2026

(54) OBJECT DETECTION DEVICE, OBJECT DETECTION METHOD, AND OBJECT DETECTION PROGRAM

(71) Applicant: DENSO CORPORATION, Kariya-city (JP)

(72) Inventors: Taketo Harada, Kariya-city (JP); Atsuhito Tawada, Kariya-city (JP); Yasutaka Atarashi, Tokyo (JP)

(73) Assignee: DENSO CORPORATION, Kariya-city (JP)

( * ) Notice: Subject to any disclaimer, the term of this patent is extended or adjusted under 35 U.S.C. 154(b) by 75 days.

(21) Appl. No.: 18/592,252

(22) Filed: Feb. 29, 2024

(65) Prior Publication Data

US 2024/0201353 A1     Jun. 20, 2024

Related U.S. Application Data

(63) Continuation of application No. PCT/JP2022/029705, filed on Aug. 2, 2022.

(30) Foreign Application Priority Data

Sep. 1, 2021     (JP) ................................. 2021-142740

(51) Int. Cl.
  *G01S 7/527*        (2006.01)
  *G01S 15/46*        (2006.01)
         (Continued)

(52) U.S. Cl.
  CPC .............. *G01S 7/527* (2013.01); *G01S 15/46* (2013.01); *G01S 15/931* (2013.01); *G01S 7/64* (2013.01)

(58) Field of Classification Search
  CPC .... G01S 7/527; G01S 7/52077; G01S 7/2813; G01S 7/4865; G01S 7/487; G01S 7/931; G01S 3/86
  See application file for complete search history.

(56) References Cited

U.S. PATENT DOCUMENTS

2019/0031100 A1*   1/2019   Lee ......................... G01S 13/00
2019/0212443 A1    7/2019   Nomura et al.
                  (Continued)

FOREIGN PATENT DOCUMENTS

JP        11-202050 A      7/1999
JP        2003-270345 A    9/2003
JP        2014-089077 A    5/2014

*Primary Examiner* — Benyam Haile
(74) *Attorney, Agent, or Firm* — Precision Patents, P.C.

(57)            ABSTRACT

An object detection device includes a condition judgment unit and a noise processing unit. The condition judgment unit judges whether an execution condition for starting an object detection operation is satisfied. The noise processing unit performs a noise-related notification corresponding to an occurrence of limitation of an object detection function due to a high noise state when the condition judgment unit judges that the execution condition is satisfied and when the high noise state is established, the high noise state being a state in which a reception state of extraneous noise, different from the reflected wave received by the plurality of object detection sensors, exceeds a predetermined judgment criterion. The object detection device is configured to perform the noise-related notification more easily when a driving mode of the own vehicle is a backward driving mode than when the driving mode is a forward driving mode.

16 Claims, 8 Drawing Sheets

(51) Int. Cl.
_G01S 15/931_      (2020.01)
_G01S 7/64_      (2006.01)

(56) References Cited

U.S. PATENT DOCUMENTS

| | | | |
|---|---|---|---|
| 2021/0255296 A1* | 8/2021 | Weissenmayer | ........ G01S 15/52 |
| 2023/0175883 A1* | 6/2023 | Yli-Alho | ............... B64U 50/13 |
| | | | 73/649 |

* cited by examiner

OBJECT DETECTION DEVICE, OBJECT DETECTION METHOD, AND OBJECT DETECTION PROGRAM

CROSS-REFERENCE TO RELATED APPLICATION

The present application is a continuation application of International Application No. PCT/JP2022/029705, filed on Aug. 2, 2022, which claims priority to Japanese Patent Application No. 2021-142740, filed on Sep. 1, 2021. The contents of these applications are incorporated herein by reference in their entirety.

BACKGROUND

Technical Field

The present disclosure relates to an object detection device configured to detect objects existing around an own vehicle using object detection sensors, and also relates to an object detection method and an object detection program for detecting objects existing around an own vehicle by using object detection sensors.

Background Art

For example, an obstacle detection device capable of improving noise resistance performance and of preventing occurrence of erroneous detection is disclosed. The obstacle detection device uses distance sensors such as ultrasonic wave sensors for detecting obstacles existing around an own vehicle. Specifically, the own vehicle is equipped with two ultrasonic wave sensors, and each of the ultrasonic wave sensors detects extraneous noise. The obstacle detection device instructs the ultrasonic wave sensors to detect extraneous noise before transmitting ultrasonic waves, and then instructs one of the ultrasonic wave sensors to transmit ultrasonic waves. When at least one of the ultrasonic wave sensors detects extraneous noise, the obstacle detection device invalidates the detection information of all ultrasonic sensors including the ultrasonic sensor that is not detecting external noise. When all ultrasonic wave sensors detect no extraneous noise, and receive reflected wave in excess of a threshold level, the obstacle detection device judges that there is an obstacle present. When all ultrasonic wave sensors detect no extraneous noise and receive no reflected wave in excess of the threshold level, the obstacle detection device determines that there is no obstacle.

SUMMARY

In the present disclosure, provided is an object detection device as the following.

The object detection device comprises: a condition judgment unit configured to judge whether an execution condition for starting an object detection operation is satisfied; and a noise processing unit configured to perform a noise-related notification corresponding to occurrence of limitation of an object detection function due to a high noise state when the condition judgment unit judges that the execution condition is satisfied and when the high noise state is established, the high noise state being a state in which a reception state of extraneous noise, different from the reflected wave received by the plurality of object detection sensors, exceeds a predetermined judgment criterion. The object detection device is configured to perform the noise-related notification more easily when a driving mode of the own vehicle is a backward driving mode than when the driving mode is a forward driving mode.

DETAILED DESCRIPTION OF THE PREFERRED EMBODIMENTS

Figure 1:
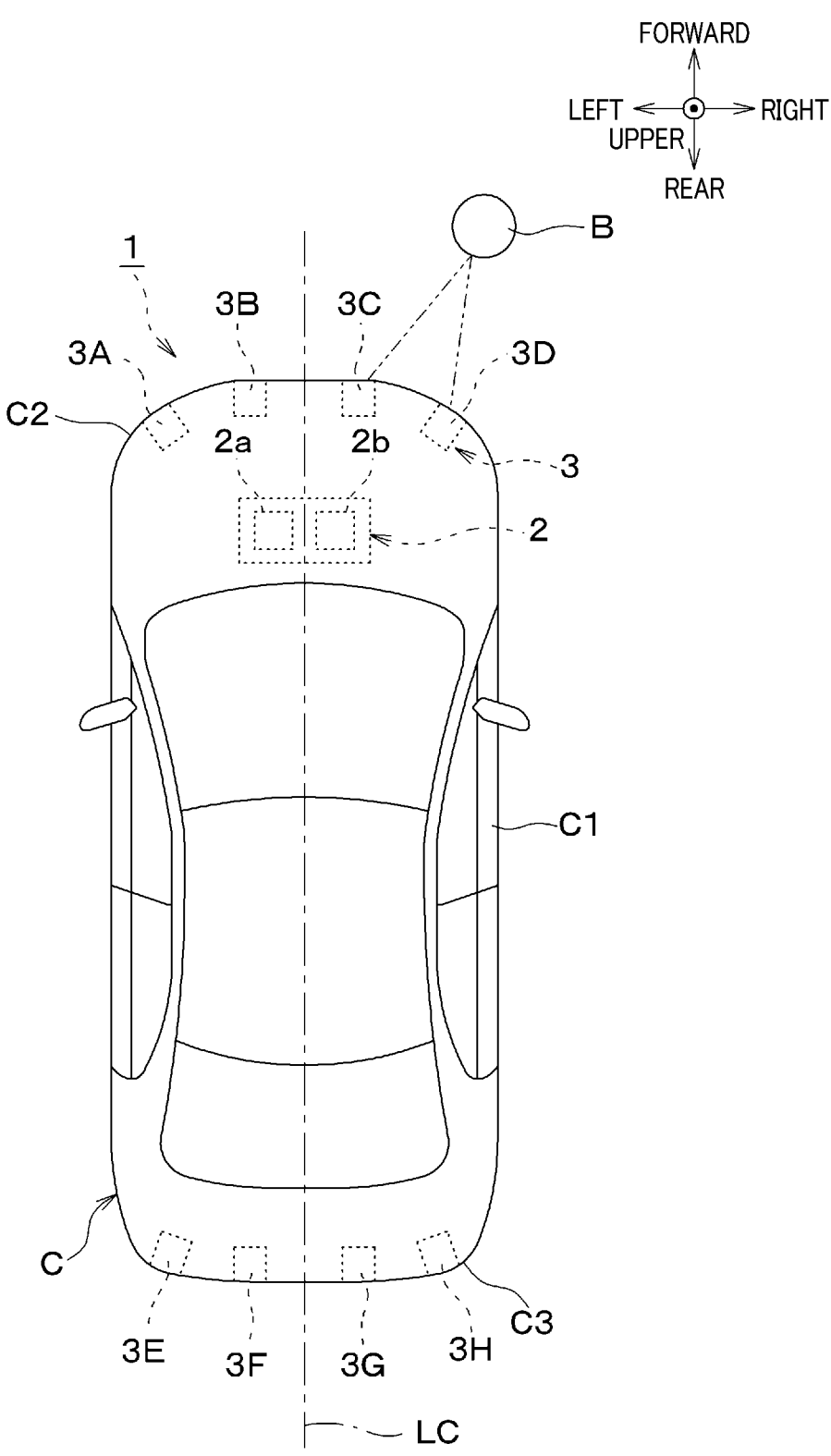
FIG. 1 is a plan view showing a schematic structure of an own vehicle equipped with a vehicle-mounted system having an object detection device according to a present embodiment.

According to the technique disclosed by patent document 1, when at least one of the ultrasonic wave sensors detects extraneous noise, the detection information of both ultrasonic sensors is invalidated. Accordingly, this technique improves the noise resistance performance compared to only invalidating the detection information from the ultrasonic sensor that detected the external noise. Further, this technique prevents issuance of warnings caused by detection of extraneous noise and obstacles present on the driving road, by issuing the warning only when all ultrasonic wave sensors detect an obstacle existing on the driving road.

Patent document 1: Japanese patent No. JP 6089585.

In a technical that uses object detection sensors to detect objects existing around an own vehicle, when the object detection function is restricted due to external noise, there is a need to notify the user of this fact. In this regard, if the noise determination is uniformly set to be sensitive regardless of usage conditions such as locations of the object detection sensors on a vehicle and the usage scene, the frequency of noise determination will increase, which may actually reduce user convenience.

The present disclosure has been made in consideration of the foregoing circumstances, and it is an object of the present disclosure to provide a technique capable of correctly providing notification to users regarding limitation of the object detection function due to reception of extraneous noise, while maintaining the user convenience.

The present disclosure provides an object detection device configured to detect an object present around an own vehicle using a plurality of object detection sensors mounted to the own vehicle, the plurality of object detection sensors transmitting an exploration wave externally from the own vehicle and receiving a reflected wave of the exploration wave reflected by the object.

In accordance with one aspect of the present disclosure, the object detection device comprises: a condition judgment unit configured to judge whether an execution condition for starting an object detection operation is satisfied; and a noise processing unit configured to perform a noise-related noti-
fication corresponding to occurrence of limitation of an
object detection function due to a high noise state when the
condition judgment unit judges that the execution condition
is satisfied and when the high noise state is established, the
high noise state being a state in which a reception state of
extraneous noise, different from the reflected wave received
by the plurality of object detection sensors, exceeds a
predetermined judgment criterion, and the object detection
device is configured to perform the noise-related notification
more easily when a driving mode of the own vehicle is a
backward driving mode than when the driving mode is a
forward driving mode.

In accordance with another aspect of the present disclo-
sure, the object detection device comprises: a condition
judgment unit configured to judge whether an execution
condition for starting an object detection operation is satis-
fied; and a noise processing unit configured to perform a
noise-related notification corresponding to occurrence of
limitation of an object detection function due to a high noise
state when the condition judgment unit judges that the
execution condition is satisfied and when the high noise state
is established, the high noise state being a state in which a
reception state of extraneous noise, different from the
reflected wave received by the plurality of object detection
sensors, exceeds a predetermined judgment criterion, and
the plurality of object detection sensors includes a front
sensor mounted to a front of the own vehicle and a rear
sensor mounted to a rear of the own vehicle, and the object
detection device is configured such that the noise-related
notification is more easily performed for the rear sensor than
for the front sensor.

The present disclosure provides an object detection
method of detecting an object present around an own vehicle
using a plurality of object detection sensors. The present
disclosure further provides an object detection program
executable by the object detection device.

In accordance with one aspect of the present disclosure,
the object detection method comprises steps of: judging
whether an execution condition for starting an object detec-
tion operation is satisfied; performing a noise-related noti-
fication corresponding to occurrence of limitation of an
object detection function due to a high noise state when
judging that the execution condition is satisfied and when
the high noise state is established, the high noise state being
a state in which a reception state of extraneous noise,
different from the reflected wave received by the plurality of
object detection sensors, exceeds a predetermined judgment
criterion, and performing the noise-related notification more
easily when a driving mode of the own vehicle is a backward
driving mode than when the driving mode is a forward
driving mode.

In accordance with another aspect of the present disclo-
sure, the object detection method comprises steps of: judg-
ing whether an execution condition for starting an object
detection operation is satisfied; performing a noise-related
notification corresponding to occurrence of limitation of an
object detection function due to a high noise state when
judging that the execution condition is satisfied and when
the high noise state is established, the high noise state being
a state in which a reception state of extraneous noise,
different from the reflected wave received by the plurality of
object detection sensors, exceeds a predetermined judgment
criterion, and the plurality of object detection sensors
including a front sensor mounted to a front of the own
vehicle and a rear sensor mounted to a rear of the own vehicle, and performing the noise-related notification more
easily for the rear sensor than for the front sensor.

In accordance with another aspect of the present disclo-
sure, the object detection program executed by the object
detection device executes steps of: judging whether an
execution condition for starting an object detection opera-
tion is satisfied; and performing a noise-related notification
corresponding to occurrence of limitation of an object
detection function due to a high noise state when judging
that the execution condition is satisfied, and when the high
noise state is established, the high noise state being a state
in which a reception state of extraneous noise, different from
the reflected wave received by the plurality of object detec-
tion sensors, exceeds a predetermined judgment criterion,
and performing the noise-related notification more easily
when a driving mode of the own vehicle is a backward
driving mode than when the driving mode is a forward
driving mode.

In accordance with another aspect of the present disclo-
sure, the object detection program executed by the object
detection device executes steps of: judging whether an
execution condition for starting an object detection opera-
tion is satisfied; and performing a noise-related notification
corresponding to occurrence of limitation of an object
detection function due to a high noise state when judging
that the execution condition is satisfied and when the high
noise state is established, the high noise state being a state
in which a reception state of extraneous noise, different from
the reflected wave received by the plurality of object detec-
tion sensors, exceeds a predetermined judgment criterion,
and the plurality of object detection sensors including a front
sensor mounted to a front of the own vehicle and a rear
sensor mounted to a rear of the own vehicle, and performing
the noise-related notification more easily for the rear sensor
than for the front sensor.

In the present disclosure, reference numbers and charac-
ters with parentheses represent only a correspondence
between elements and means described in the following
embodiments. Accordingly, the concept of the present dis-
closure is not limited by the reference numbers and charac-
ters.

Embodiment

Next, a description will be given of an embodiment of the
present disclosure with reference to drawings. Applicable
modifications to the embodiments of the present disclosure
will be described following the explanation of all of the
embodiments because misunderstanding of the present dis-
closure may result when the applicable modifications are
described following the explanation of each embodiment.
Structure of Vehicle-Mounted System FIG. 1 shows a vehicle-mounted system 1 mounted to a
vehicle C as a moving body. The vehicle C is a four-wheeled
vehicle travelling on a road. The vehicle C has a box-shaped
body C1 that is approximately rectangular in a plan view. In
a plan view, the shape of each part of the vehicle C
represents a shape when this part is viewed in a direction
parallel with the gravity direction when the vehicle C is
placed in stable condition, to be travelable, on a horizontal
plane. The vehicle C1 equipped with the vehicle-mounted
system according to the present disclosure will be referred to
as the own vehicle.

Hereinafter, a virtual direct line in the plan view, in
parallel with the longitudinal direction of the own vehicle, is
referred to with the vehicle width center line LC. The vehicle
width center line LC passes through the center line of the own vehicle in a vehicle width direction. The vehicle width center line LC is also referred to as the vehicle center line. The longitudinal direction of the own vehicle intersects the vehicle width direction at right angles, and also intersects the vehicle height direction at right angles. The height of the own vehicle is measured in the vehicle height direction. The vehicle height direction is in parallel with the gravity direction when the own vehicle is placed in stable condition, to be travelable, on a horizontal plane. FIG. 1 shows those directions "Forward", "Rear", "Left", "Right", and "Top". That is, the longitudinal direction of the own vehicle corresponds to the forward direction and the rear direction. The vehicle width direction corresponds to the left direction and the right direction.

The vehicle-mounted system 1 is equipped with an object detection ECU 2 as the object detection device. ECU is an abbreviation for an Electronic Control Unit or an Electric Control Unit. The object detection ECU 2 is mounted inside of the own vehicle, that is, is mounted inside of the body C1 of the own vehicle. The object detection ECU 2 according to the present embodiment is a vehicle-mounted microcomputer equipped with a processor 2a and a memory 2b. The processor 2a is composed of a CPU or MPU. The memory 2b is composed of at least either a ROM or a non-volatile rewritable memory as non-transitory storage medium, where the non-transitory storage medium is a ROM, a RAM and a non-volatile rewritable memory. Information is written into a non-volatile rewritable memory during the turned-on state of a power supply. Information is not rewritten into the non-volatile rewritable memory and the information is maintained during the turned-off of the power supply. There is a flash ROM as the non-volatile rewritable memory. The object detection ECU 2 is configured to read programs stored in the memory 2b and to execute the programs so as to control the overall operation of the vehicle-mounted system 1.

The object detection ECU 2 uses an object detection sensor 3 to detect an object present around the own vehicle. The object detection sensor 3 is mounted to the own vehicle and is configured to transmit exploration waves toward the outside of the own vehicle and to receive reflected waves from an object B. The present embodiment uses a plurality of distance sensors, as the object detection sensor 3. The distance sensors are configured to obtain distance information. For example, the distance information represents a propagation time counted from a start time when the propagation of exploration waves starts to a reception time when the reflected waves are received. The distance information also represents an estimated distance measured from the object detection sensor 3 to the object B, which is calculated based on the propagation time.

Specifically, the object detection sensor 3 is an ultrasonic wave sensor configured to emit exploration waves as ultrasonic waves toward the outside of the own vehicle, and to receive reflected waves from the object B. The object detection sensor 3 is configured to detect whether the object B is present and to calculate a distance between the object detection sensor 3 and the object B when the object B is present based on the reception of the reflected waves. The present embodiment provides the object detection sensor 3 of a transceiver type having a transmitter function and a receiver function, The transmitter function transmits exploration waves toward the outside of the own vehicle, and the receiver function receives reflected waves from the object B.

A first front sensor 3A, a second front sensor 3B, a third front sensor 3C and a fourth front sensor 3D are mounted as the object detection sensor 3 on a front bumper C2 arranged at a front side of the body C1 of the own vehicle. Similarly, a first rear sensor 3E, a second rear sensor 3F, a third rear sensor 3G and a fourth rear sensor 3H are mounted as the object detection sensor 3 on a rear bumper C3 arranged at a rear side of the body C1 of the own vehicle.

The first front sensor 3A is arranged near a left end of the front bumper C2 so as to transmit transmission waves toward the left forward direction of the own vehicle. The second front sensor 3B is arranged between the first front sensor 3A and the vehicle width center line LC in the vehicle width direction so as to transmit transmission waves roughly toward a forward direction of the own vehicle. The third front sensor 3C is arranged at a position substantially symmetrical to the second front sensor 3B with respect to the vehicle width center line LC. The third front sensor 3C is also arranged between the vehicle width center line LC and the fourth front sensor 3D in the vehicle width direction so as to transmit transmission waves roughly toward the forward direction of the own vehicle. The fourth front sensor 3D is arranged at a position substantially symmetrical to the first front sensor 3A with respect to the vehicle width center line LC. The fourth front sensor 3D is also arranged near a right end of the front bumper C2 so as to transmit transmission waves toward the right forward direction of the own vehicle.

The first front sensor 3A, the second front sensor 3B, the third front sensor 3C and the fourth front sensor 3D are configured to receive direct waves and indirect waves. The present embodiment defines the direct waves and the indirect waves as follows. For example, one of the plurality of object detection sensors 3 (for example, the first to fourth front sensors 3A to 3D) arranged along the vehicle width direction and attached to on one of the bumpers (for example, the front bumper C2), is referred to as the first distance sensor, and another one is referred to as the second distance sensor. The received waves are referred to as the direct waves when the first distance sensor transmits the exploration waves and the same first distance sensor receives the waves, as the received waves, i.e., the reflected waves of the exploration waves reflected by the object B. Specifically, the direct waves mean the received waves when the first distance sensor transmits the exploration waves and the same first detection sensor receives the reflected waves of the exploration waves reflected by the object B, as the received waves. That is, the direct waves indicate the received waves when the object detection sensor 3 transmits the exploration waves and the same object detection sensor 3 receives the reflected waves, as the received waves, from the object B. On the other hand, the received waves are referred to as the indirect waves when the first distance sensor transmits the exploration waves, and the second distance sensor receives the received waves of the exploration waves reflected by the object B. Specifically, the indirect waves are the received waves when the first distance sensor transmits the exploration waves and the second distance sensor receives the reflected waves of the exploration waves reflected by the object B, as the received waves. That is, the indirect waves are the received waves, when the object detection sensor 3 that transmits the exploration waves and the object detection sensor 3 that detects the reflected waves of the exploration waves reflected by the object B as the received waves, are different. Each of the first front sensor 3A, the second front sensor 3B, the third front sensor 3C and the fourth front sensor 3D is configured to receive reflected waves of the exploration waves transmitted from another one of the front sensors.

The first rear sensor 3E is arranged near a left end of the rear bumper C3 so as to transmit transmission waves in the left backward direction of the own vehicle. The second rear sensor 3F is arranged between the first rear sensor 3E and the vehicle width center line LC in the vehicle width direction so as to transmit transmission waves roughly toward a backward direction of the own vehicle. The third rear sensor 3G is arranged at a position substantially symmetrical to the second rear sensor 3F with respect to the vehicle width center line LC. The third rear sensor 3G is also arranged between the vehicle width center line LC and the fourth rear sensor 3H in the vehicle width direction so as to transmit transmission waves roughly toward the backward direction of the own vehicle. The fourth rear sensor 3H is arranged is arranged at a position substantially symmetrical to the first rear sensor 3E with respect to the vehicle width center line LC. The fourth rear sensor 3H is arranged near a right end of the rear bumper C3 so as to transmit transmission waves toward the right backward direction of the own vehicle. The first rear sensor 3E, the second rear sensor 3F, the third rear sensor 3G and the fourth rear sensor 3H are configured to receive direct waves and indirect waves.

Figure 2:
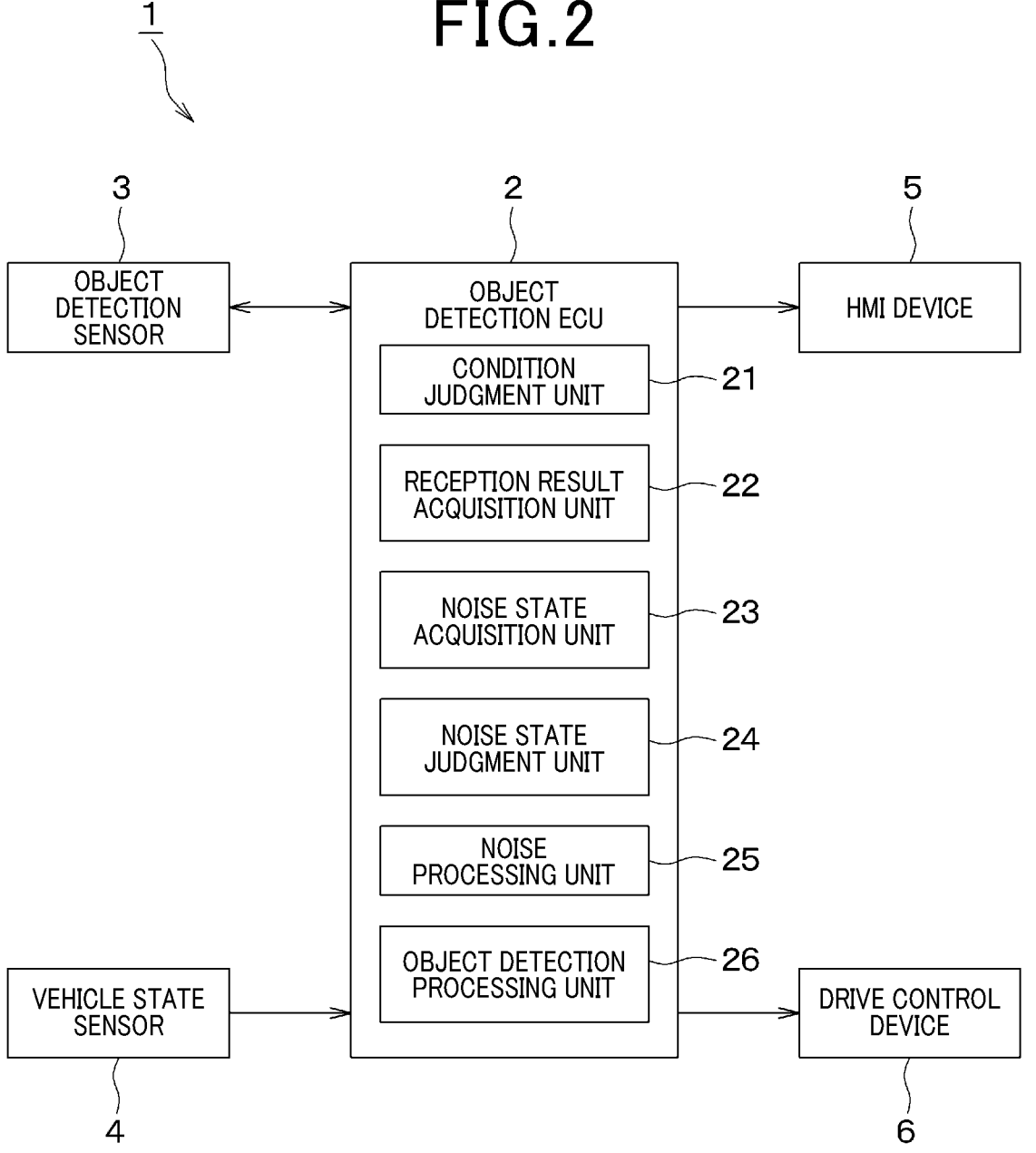
FIG. 2 is a block diagram showing a schematic functional structure of the vehicle-mounted system shown in FIG. 1.

As shown in FIG. 1 and FIG. 2, the vehicle-mounted system 1 is equipped with a vehicle state sensor 4, an HMI device 5 and a drive control device 6 in addition to the object detection ECU 2 and the object detection sensor 3, where the term HMI is an abbreviation for a human machine interface. FIG. 1 shows the object detection sensor 3 composed of the first front sensor 3A to the fourth rear sensor 3H. FIG. 2 shows the object detection sensor 3 only for brevity. The object detection ECU 2 are connected to the object detection sensor 3, the vehicle state sensor 4, the HMI device 5 and the drive control device 6 through a vehicle-mounted information communication line so as to transmit and receive signals and information.

The vehicle state sensor 4 is configured to acquire information or signals representing various quantities in operation state of the own vehicle, and to transmit the acquired information or signals to the object detection ECU 2. For example, the various quantities of the operation state of the own vehicle contain various quantities related to the driving state, such as an accelerator pedal operation quantity, a brake pedal operation quantity, a shift gear position, a steering angle, etc. Further, the various quantities of the operation state of the own vehicle contain physical quantities related to the behavior of the own vehicle such as a vehicle speed, an angular velocity, a forward and backward acceleration, a left and right direction acceleration, etc. That is, the vehicle state sensor 4 is composed of a shift gear position sensor, a vehicle speed sensor, an accelerator opening sensor, a steering angle sensor, an angular velocity sensor, an acceleration sensor, a yaw rate sensor, etc. The vehicle state sensor 4 is a general term for those known sensors necessary for performing the driving control of the own vehicle, for brevity.

The HMI device 5 has a display device and/or an audio output device mounted to the own vehicle, and is configured to provide various information to passengers such as the driver of the own vehicle. Specifically, the HMI device 5 has the display device such as meters and display equipment, the audio output device such as a speaker, and an input device for receiving instructions from the passengers such as the driver of the own vehicle.

The drive control device 6 is configured to perform the motion control of the own vehicle in a vertical direction and/or a lateral direction. That is, the drive control device 6 is a generic name for brevity, which contains a drive control device, a braking control device, a steering control device, etc. so as to perform the motion control of the own vehicle in the vertical direction and lateral direction.

As previously described, the vehicle-mounted system 1 is configured to use the object detection sensor 3, to detect an obstacle as the object B present around the own vehicle, and to perform various vehicle control operation, for example, a collision avoidance operation, a parking assistance operation, etc., based on the detected results. Further, the vehicle-mounted system 1 instructs the HMI device 5 to perform the notification operation and warning operation based on the obstacle detection results and the vehicle control operation due to the obstacle detection results.

Object Detection Device: First Embodiment

The object detection ECU 2 is configured to read programs stored in the memory 2b and to execute the programs so as to perform the object detection operation. The object detection ECU 2 executes those programs to realize various functions, a condition judgment unit 21, a reception result acquisition unit 22, a noise state acquisition unit 23, a noise state judgment unit 24, a noise processing unit 25 and an object detection processing unit 26. A description will now be given of each of the functions of the object detection ECU 2.

The condition judgment unit 21 is configured to detect whether an execution condition for starting the object detection operation is satisfied. For example, the execution condition contains a condition when the shift gear position is in the drive gear position of the forward direction and the backward direction, and is not at a P shift gear position (P range) and a N shift gear position (N range). The execution condition also contains the condition when the own vehicle travels at a low vehicle speed. The execution condition is also referred to as the operation condition of the object detection sensor 3. Further, the execution condition is also referred to as the operation condition of the object detection sensor 3. When the execution condition is satisfied and the object detection sensor 3 performs the transmission and reception operation, the reception result acquisition unit 22 is configured to acquire, i.e., to receive the reception results transmitted from the object detection sensor 3. Further, the reception result acquisition unit 22 is configured to store the reception results transmitted from the object detection sensor 3, composed of the plurality of sensors previously described, into the memory such as a RAM, a non-volatile rewritable memory for a predetermined period or a predetermined amount.

The noise state acquisition unit 23 is configured to acquire, i.e., to calculate a characteristics value corresponding to the reception state of extraneous noise based on the reception results obtained by the reception result acquisition unit 22. The extraneous noise represents noise due to the reception of ultrasonic wave, excepting reflected waves of the exploration waves reflected by the object B, the exploration waves being transmitted from the own vehicle. That is, the extraneous noise contains exploration waves transmitted from another vehicle and ultrasonic waves generated from air-brake generated by truck vehicles. The characteristics value corresponds to the present state of extraneous noise on received waves as ultrasonic waves detected by the object detection sensor 3. Specifically, the characteristics value corresponds to a reception frequency of extraneous noise, for example. The reception frequency of extraneous noise represents the frequency of receiving extraneous noise during a noise monitoring period, which has been determined immediately before the transmission of exploration waves. In more detail, the reception frequency is a reception count value of extraneous noise during the noise monitoring period, for example, is one count when extraneous noise is received only once during the noise monitoring period. The reception frequency of extraneous noise also indicates a continuous period of time or a continuous number of times when a reception frequency of extraneous noise excesses a predetermined frequency threshold value, for example.

The noise state judgment unit 24 is configured to detect whether a high noise state is established in which the reception state of extraneous noise exceeds a predetermined judgment criterion. Specifically, when the characteristics value exceeds the judgment threshold value corresponding to the judgment criterion, the noise state judgment unit 24 is configured to judge that a high noise state in the object detection sensor 3 is established. The present embodiment uses the judgment threshold value of the forward driving mode greater than the judgment threshold value of the backward driving mode. That is, the noise state judgment unit 24 is configured to use the judgment threshold value in the forward driving mode higher than the judgment threshold value in the backward driving mode. The forward driving mode refers to a state in which the shift position is in a position other than the reverse gear position (for example, D range). On the other hand, the backward driving mode refers to a state in which the shift position is in the reverse gear position (i.e., R range).

The noise processing unit 25 is configured to perform noise-related notification corresponding to an occurrence of limitation of an object detection function due to a high noise state when the noise state judgment unit 24 judges that the high noise state is established. That is, the noise processing unit 25 performs the noise-related notification through the HMI device 5 when the condition judgment unit 21 judges that the execution condition of the object detection operation is established, and the noise state judgment unit 24 judges that the high noise state is established. The present embodiment provides the object detection ECU 2 which is configured to set the judgment threshold value for the high noise state as described above. This makes it possible to perform the noise-related notification in the backward driving mode of the own vehicle more easily than the forward driving mode.

The object detection processing unit 26 detects the presence or absence of object B and a distance between the own vehicle and the object B based on the received waves, when the condition judgment unit 21 judges that the execution condition for starting the object detection operation is satisfied, and when the judgment of the high noise state is not established. Further, the object detection processing unit 26 notifies the detection result of the object B to the passengers such as the driver of the own vehicle through the HMI device 5, and further transmits the detection result of the object B to the drive control device 6.

Summary of Operation

A description will be given of the summary of operation of the object detection ECU 2, the object detection method, objection detection programs performed by the object detection ECU 2, and effects thereof according to the present embodiment with reference to drawings. The object detection ECU 2, and the object detection method and the objection detection programs performed by the object detection ECU 2 in the present embodiment are collectively referred to as the present embodiment.

The object detection ECU 2 performs the repetitive execution of the object detection operation every predetermined period (for example, every 100 msec) when the execution condition to perform the object detection operation is satisfied. Specifically, during a low-speed driving in the forward driving mode, one of the first front sensor 3A to the fourth front sensor 3D transmits the exploration waves, and each of the first front sensor 3A to the fourth front sensor 3D receives reflected waves. Similarly, during the low-speed driving in the backward driving mode, one of the first rear sensor 3E to the fourth rear sensor 3H transmits the exploration waves, and each of the first rear sensor 3E to the fourth rear sensor 3H receives reflected waves. This makes it possible to perform a triangulation method using the distance information of the direct waves and the distance information of the indirect waves, and to calculate a relative position of the object B to the own vehicle based on the result of the triangulation method. That is, the object detection sensor 3 for transmitting the exploration waves is switched every predetermined period.

Figure 3:
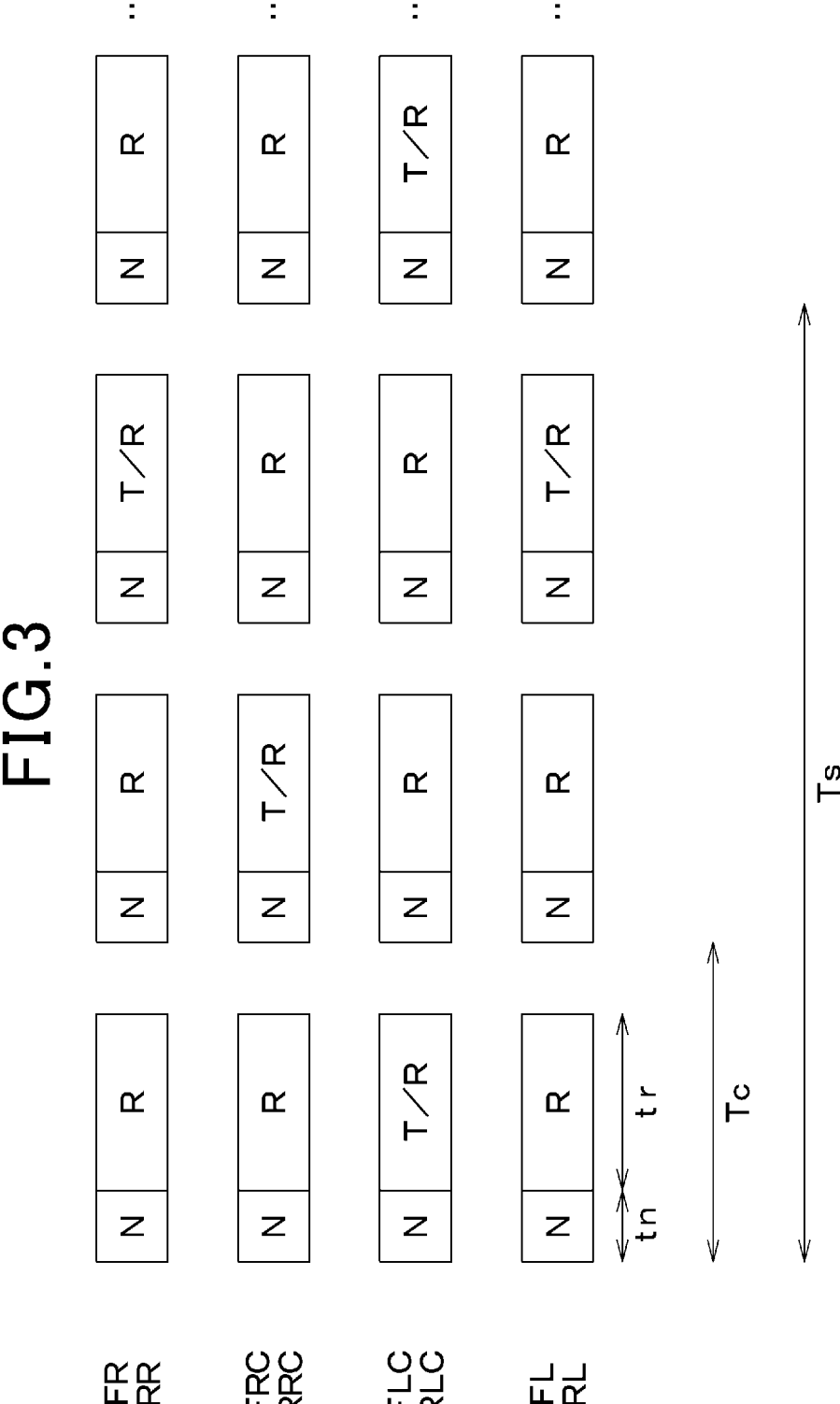
FIG. 3 is a timing chart showing the operation timing of each of object detection sensors included in the vehicle-mounted system shown in FIG. 2.

FIG. 3 shows the repetitive execution of the object detection operation every predetermined period. In FIG. 3, reference character FR represents the fourth front sensor 3D, FRC represents the third front sensor 3C, FLC represents the second front sensor 3B, and FL represents the first front sensor 3A. Reference character RR represents the fourth rear sensor 3H, RRC represents the third rear sensor 3G, RLC represents the second rear sensor 3F, and RL represents the first rear sensor 3E. In the timing chart shown in FIG. 3, reference character N represents the noise monitoring period, R represents the reception period, and T/R represents a transmission/reception period.

As shown in FIG. 3, when the object detection operation starts during the low-speed driving in the forward driving mode, the second front sensor 3B (see FLC shown in FIG. 3) transmits the exploration waves. The first front sensor 3A, the third front sensor 3C and the fourth front sensor 3D which are not the transmission source of the exploration waves, perform the reception process of receiving the reflected waves during the predetermined period tr counted from the transmission time of the exploration waves. On the other hand, the second front sensor 3B which transmitted the exploration waves waits to perform the reception operation until the elapse of a waiting period counted from the transmission time of the exploration waves to the time when the reverberations have sufficiently converged. After the elapse of the waiting period, the second front sensor 3B starts to receive the direct waves. The transmission source of the exploration waves is switched in the following order: the second front sensor 3B→the third front sensor 3C→the first front sensor 3A and the fourth front sensor 3D→the second front sensor 3B . . . . The switching period Tc of the transmission source corresponds to the predetermined period previously described. Every cycle period Ts (for example, every 500 msec), each of the plurality of object detection sensor 3 mounted on one of the bumpers (for example, the first front sensor 3A to the fourth front sensor 3D mounted on the front bumper C2) performs the object detection operation in order. Similarly, when the object detection operation starts during the low-speed driving in the backward driving mode, the transmission source of the exploration waves is switched in the following order: the second rear sensor 3F→the third rear sensor 3G→the first rear sensor 3E and the fourth rear sensor 3H→the second front sensor 3B . . . .

As shown in FIG. 3, each of the object detection sensor 3 for transmitting and receiving (i.e., designated by T/R) and the object detection sensor 3 for receiving (i.e., designated by R) uses the noise monitoring period tn immediately before the transmission time of the exploration waves. During the noise monitoring period tn, each of the object detection sensor 3 mounted to the own vehicle does not transmit any exploration wave. The noise monitoring period tn is not a period in which the reflected wave of the exploration waves transmitted immediately before the noise monitoring period tn reflected from the object B arrives, the object B being present within a predetermined object detection area (for example, 10 m). Accordingly, this makes it possible to recognize that ultrasonic waves are extraneous noise, where the ultrasonic waves have a frequency within a predetermined frequency band containing the frequency of the exploration waves received within the noise monitoring period tn.

The noise state acquisition unit 23 acquires the reception state of extraneous noise during the noise monitoring period tn. The noise state judgment unit 24 judges whether a high noise state is established in which the reception state of extraneous noise exceeds a predetermined judgment criterion. The noise state acquisition unit 23 acquires the frequency of receiving extraneous noise. Specifically, the noise state acquisition unit 23 calculates the total number of counts of each of the object detection sensor 3, where the number of counts becomes one when a corresponding sensor receives extraneous noise once during the noise monitoring period tn. The noise state judgment unit 24 judges that the high noise state is established when extraneous noise has been detected k1 times or more during the noise monitoring period tn of past k times. Alternatively, for example, the noise state judgment unit 24 sets a noise flag when extraneous noise is detected k1 times or more during the noise monitoring period tn of the past k times. The noise state judgment unit 24 judges that the high noise state is established when the set noise flag is continued during a predetermined period of time or a predetermined number of times. The noise processing unit 25 instructs the HMI device 5 to provide noise-related notification when the noise state judgment unit 24 judges that the high noise state is established.

The frequency of executing the forward driving mode using the first front sensor 3A to the fourth front sensor 3D is greater than the frequency of executing the backward driving mode using the first rear sensor 3E to the fourth rear sensor 3H. Further, in the forward driving mode, when the own vehicle passes through another vehicle such as an oncoming vehicle, radio interference between the own vehicle and the another vehicle is likely to occur. On the other hand, the backward driving mode is used in limiting scene such as a reverse parking scene and a reverse out scene of a parking space.

The user, i.e., the driver of the own vehicle visually and easily recognizes a forward view of the own vehicle during the forward driving mode. Accordingly, if the driver is notified one by one that the object detection function is limited due to the high noise state, the driver may feel bothered. On the other hand, during the backward driving mode, it is relatively difficult for the driver of the own vehicle to visually recognize a backward view of the own vehicle. In this situation, it is preferable to provide, to the driver of the own vehicle, the notification corresponding to occurrence of limitation of the object detection function due to the high noise state.

Accordingly, during the forward driving mode, it is preferable to avoid excessive judgment of the high noise state and preferable to avoid excessive notification regarding an occurrence of the high noise state for providing to the driver of the own vehicle. On the other hand, during the backward driving mode, it is preferable to make the judgment of the high noise state relatively sensitive. The present embodiment provides the judgment threshold value used in the forward driving mode which is greater than the judgment threshold value used in the backward driving mode. The use of the judgment threshold value for the high noise state makes it possible to provide the noise-related notification to the driver of the own vehicle in the backward driving mode more easily than that in the forward driving mode. This makes it possible to correctly provide, to the user of the own vehicle, the notification corresponding to an occurrence of limitation of the object detection function due to the reception of extraneous noise, while suppressing the inconvenience.

Example of Operation

A description will be given of an exemplary operation of the object detection device, the method and programs according to the present embodiment with reference to FIG. 1 to FIG. 3 and the flow charts shown in FIG. 4 and FIG. 5. In the flow charts shown in FIG. 4 and FIG. 5, and FIG. 7 and FIG. 8, reference character S represents Step.

The processor 2a reads programs stored in the memory 2b and starts to execute the programs at a predetermined timing. This process corresponds to the routine shown in FIG. 4. When executing the programs, the processor 2a judges whether a high noise state flag FN is reset (FN=0) in step S401. When judging that it is the high noise state, the processor 2a sets the high noise state flag FN to the value of 1 (FN=1). In particular, this high noise state flag FN is different from the noise flag previously described. When the detection result in step S401 indicates that the high noise state flag FN has been set (NO in step S401), the processor 2a does not executes step S402 and all of steps after step S402 in the routine shown in FIG. 4. The processor 2a advances the operation flow to END and temporarily ends this routine. On the other hand, when the detection result in step S401 indicates that the high noise state flag FN has been reset (YES in step S401), the processor 2a advances the operation flow to step S402.

In step S402, the processor 2a judges whether the operation condition to execute the object detection operation is satisfied, i.e., whether the condition for executing the object detection sensor 3 is satisfied. When the detection result indicates negative (NO in step S402), i.e., when the operation condition is not satisfied, the processor 2a advances the operation flow to END, i.e., does not execute step S403 and further steps, and temporarily ends this routine. On the other hand, when the detection result indicates positive (YES in step S402), i.e., when the detection result indicates that the operation condition is satisfied, the processor 2a advances the operation flow to step S403 and further steps.

In step S403, the processor 2a instructs each of the object detection sensor 3 to execute the transmission and reception operation. Specifically, during the forward driving mode, the processor 2a instructs the first front sensor 3A to the fourth front sensor 3D to operate in the manner shown in FIG. 3. During the backward driving mode, the processor 2a instructs the first rear sensor 3E to the fourth rear sensor 3H to operate in the manner shown in FIG. 3. This transmission and reception process contains the noise monitoring process for receiving the reception state of extraneous noise during the noise monitoring period tn.

In step S404, the processor 2a acquires, i.e., receives, from each of the object detection sensors 3, the judgment result of the noise monitoring process, that is, the reception state of extraneous noise during the noise monitoring period tn in each of the object detection sensors 3. Further, the processor 2a calculates the characteristics value corresponding to the reception state of extraneous noise based on the acquired reception state. Specifically, the processor 2a calculates a reception frequency Rn of extraneous noise. The processor 2a calculates a continuous characteristics value Sn as the continuous period of time or a continuous number of times of a state in which the reception frequency Rn exceeds a predetermined frequency threshold value Rn_th1 (that is, of a state in which the high noise state flag FN is set).

In step S405, the processor 2a judges whether the execution of the noise monitoring process and the acquisition of the result of the noise monitoring process are performed the predetermined number Na of times or more, i.e., judges whether the process in step S403 and the process in step S404 are performed the predetermined number Na of times or more. When the judgment result indicates less than the predetermined number Na of times (NO in step S405), the operation flow returns to step S402. When the detection result indicates the predetermined number Na of times or more (YES in step S405), the processor 2a advances the operation flow to step S406.

In step S406, the processor 2a judges whether the reception frequency Rn exceeds the frequency threshold value Rn_th1. That is, the processor 2a judges whether the reception number of times of receiving extraneous noise in the noise monitoring process of past Na times exceeds the predetermined number of times. In other words, the processor 2a judges whether the high noise state flag FN has been set, where reference character Na corresponds to the variable k, and Rn_th1 corresponds to the variable k1. The present embodiment uses different values of the frequency threshold value Rn_th1 for the forward driving mode and the backward driving mode. Specifically, the processor 2a uses the frequency threshold value Rn_th1 for the forward driving mode which is greater than the frequency threshold value Rn_th1 for the backward driving mode. When the reception frequency Rn is less than or equal to the frequency threshold value Rn_th1 (NO in step S406), the processor 2a advances the operation flow to END, i.e., does not execute the step S407 and the steps following the step S407, and the processor 2a temporarily ends this routine. On the other hand, when the reception frequency Rn exceeds the frequency threshold value Rn_th1 (YES in step S406), the processor 2a advances the operation flow to step S407.

In step S407, the processor 2a judges whether the continuous characteristics value Sn exceeds a continuous threshold value Sn_th1. Specifically, the processor 2a judges whether the reception number of times of receiving extraneous noise in the noise monitoring period of past Na times more than the predetermined number of times, is continued over the predetermined number of times or the predetermined period of time. The present embodiment uses different continuous threshold value Sn_th1 in the forward driving mode and the backward driving mode. Specifically, the processor 2a uses the continuous threshold value Sn_th1 for the forward driving mode which is greater than the continuous threshold value Sn_th1 for the backward driving mode.

When the continuous characteristics value Sn is less than or equal to the continuous threshold value Sn_th1 (NO in step S407), the processor 2a advances the operation flow to END, i.e., does not execute step S408 and step S409, and temporarily ends this routine. On the other hand, when the continuous characteristics value Sn exceeds the continuous threshold value Sn_th1 (YES in step S407), the processor 2a executes step S408 and step S409, and then temporarily ends this routine. In step S408, the processor 2a instructs the HMI device 5 to execute the noise-related notification. In step S409, the processor 2a sets the high noise state flag FN (that is, FN=1).

Figure 5:
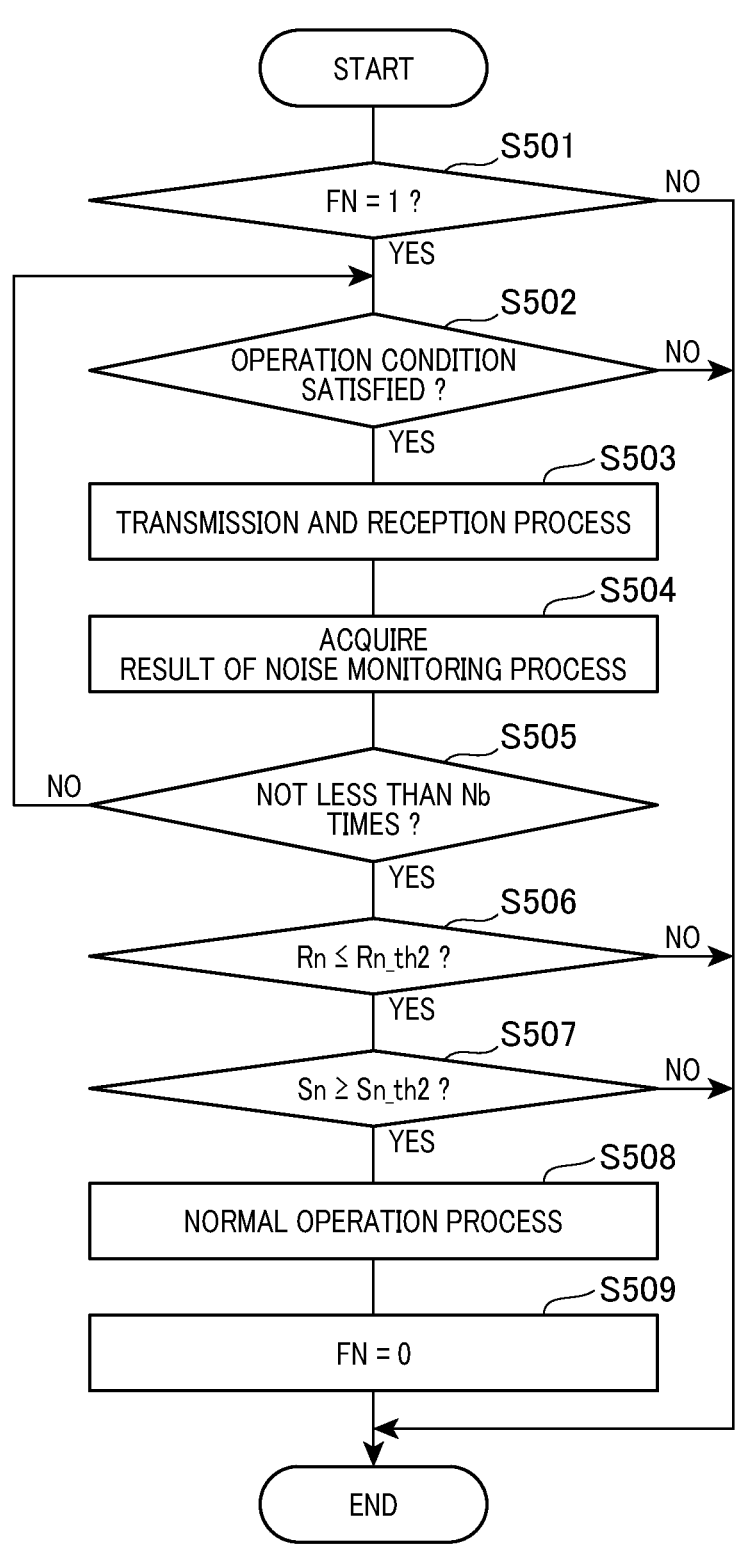
FIG. 5 is another flow chart showing the schematic first operation of the vehicle-mounted system shown in FIG. 1.

The processor 2a reads the programs, stored in the memory 2b, corresponding to the routine shown in FIG. 5, and starts to execute the programs at a predetermined timing. When starting to execute the programs, the processor 2a judges whether the high noise state flag FN has been set (that is, FN=1) in step S501. When the judgment result indicates that the high noise state flag FN has been reset (NO in step S501), the processor 2a does not executes step S502 and all of steps after step S502 and temporarily ends this routine. On the other hand, when the judgment result in step S501 indicates that the high noise state flag FN has been set (YES in step S501), the processor 2a advances the operation flow to step S502.

Figure 4:
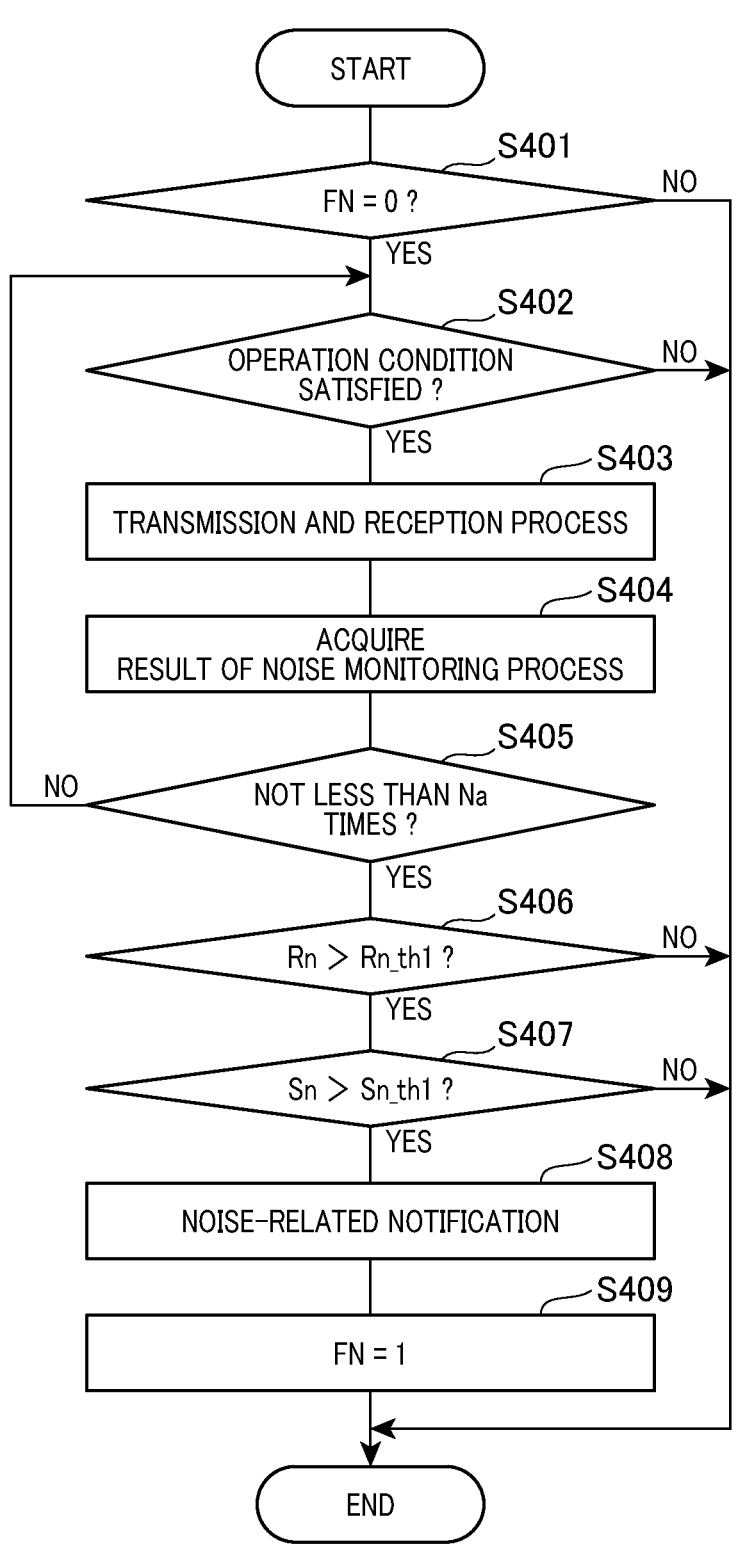
FIG. 4 is a flow chart showing a schematic first operation of the vehicle-mounted system shown in FIG. 1.

The processes from step S502 to step S504 are the same as the processes from step S402 to step S404 shown in FIG. 4. The explanation of processes from step S502 to step S504 is omitted for brevity. In step S505, the processor 2a judges whether the execution of the noise monitoring process and the acquisition of the result of the noise monitoring process are performed a predetermined number Nb of times or more, i.e., judges whether the processes in step S503 and step S504 have been executed a predetermined number Nb of times or more. It is acceptable for the predetermined number Nb of times to have the same value of the predetermined number Na of times previously described, or to have a value different from the predetermined number Na of times. When the judgment result in step S505 indicates negative (NO in step S505), i.e., less than the predetermined number Nb of times, the operation flow returns to step S502. On the other hand, when the judgment result in step S505 indicates positive (YES in step S505), i.e., the predetermined number Nb of times or more, the processor 2a advances the operation flow to step S506.

In step S506, the processor 2a judges whether the reception frequency Rn is less than or equal to a frequency threshold value Rn_th2. That is, the processor judges whether the reception number of times of receiving extraneous noise in the noise monitoring period of past Nb times is less than or equal to a predetermined number of times. The present embodiment uses the different frequency threshold value Rn_th2 in the forward driving mode and the backward driving mode. Specifically, the processor 2a uses the frequency threshold value Rn_th2 for the forward driving mode which is greater than the frequency threshold value Rn_th2 for the backward driving mode so as to more rapidly prohibit the execution of the judgment process of the high noise state. When the reception frequency Rn exceeds the frequency threshold value Rn_th2 (NO in step S506), the processor 2a temporarily ends this routine without processing step S507 and all of steps after step S507. On the other hand, when the reception frequency Rn is less than or equal to the frequency threshold value Rn_th2 (YES in step S506), the processor 2a advances the operation flow to step S507.

In step S507, the processor 2a judges whether the continuous characteristics value Sn is greater than or equal to a continuous threshold value Sn_th2. In this case, the continuous characteristics value Sn represents the continuous period of time or the continuous number of times when the reception frequency Rn is less than or equal to the frequency threshold value Rn_th2. That is, the processor 2a judges whether the specific situation, in which the reception number of times of receiving extraneous noise in the noise monitoring process of past Nb times is equal to or less than a predetermined number of times, occurs a predetermined number of times or more, or continues for a predetermined period of time or more. The present embodiment uses different values of the continuous threshold value Sn_th2 for the forward driving mode and the backward driving mode. Specifically, the processor 2a uses the continuous threshold value Sn_th2 for the forward driving mode which is less than the continuous threshold value Sn_th2 for the backward driving mode so as to more rapidly prohibit the execution of the judgment process of the high noise state.

When the judgment result indicates that the continuous characteristics value Sn is less than the continuous threshold value Sn_th2 (NO in step S507), the processor 2a temporarily ends this routine without execution of step S508 and steps after step S508. On the other hand, when the judgment result indicates that the continuous characteristics value Sn is more than or equal to the continuous threshold value Sn_th2 (YES in step S507), the processor 2a executes the process in step S508 and the process in step S509, and then temporarily ends this routine. In step S508, the processor 2a executes the usual operation, that is, operation when it is not high noise state. Specifically, the processor 2a completes the noise-related notification using the HMI device 5, and instructs the HMI device 5 to execute the notification as necessary that the object detection operation can be executed effectively or is being executed effectively. In step S509, the processor 2a resets the high noise state flag FN (that is, FN=0).

Second Embodiment

The second embodiment will be described below. Note that in the following description of the second embodiment, parts that are different from the first embodiment will be mainly described. Further, in the first embodiment and the second embodiment, parts that are the same or equivalent to each other are given the same reference numerals. Therefore, in the following description of the second embodiment, for components having the same reference numerals as those in the first embodiment, the description in the first embodiment may be used as appropriate unless there is a technical contradiction or special additional explanation. The same applies to the third embodiment and subsequent embodiments to be described later.

The vehicle-mounted system 1 according to the present embodiment has the same structure as the vehicle-mounted system 1 according to the first embodiment. That is, the vehicle-mounted system 1 according to the present embodiment has the same structure shown in FIG. 1 and FIG. 2. The vehicle-mounted system 1 according to the present embodiment performs the operation and has the functions thereof, which are different from those of the vehicle-mounted system 1 according to the first embodiment.

Figure 6:
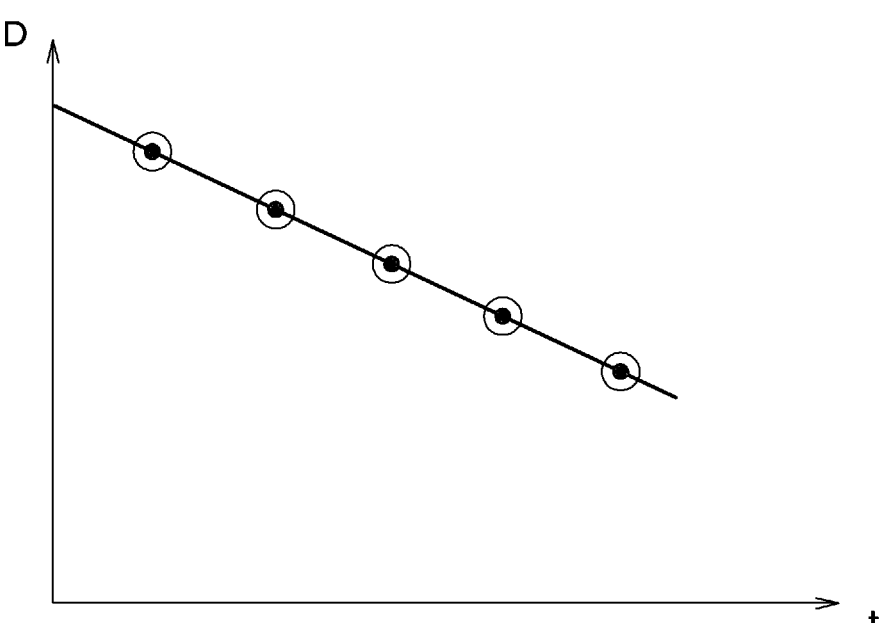
FIG. 6 are graphs showing a schematic second operation of the vehicle-mounted system shown in FIG. 1.
Figure 6:
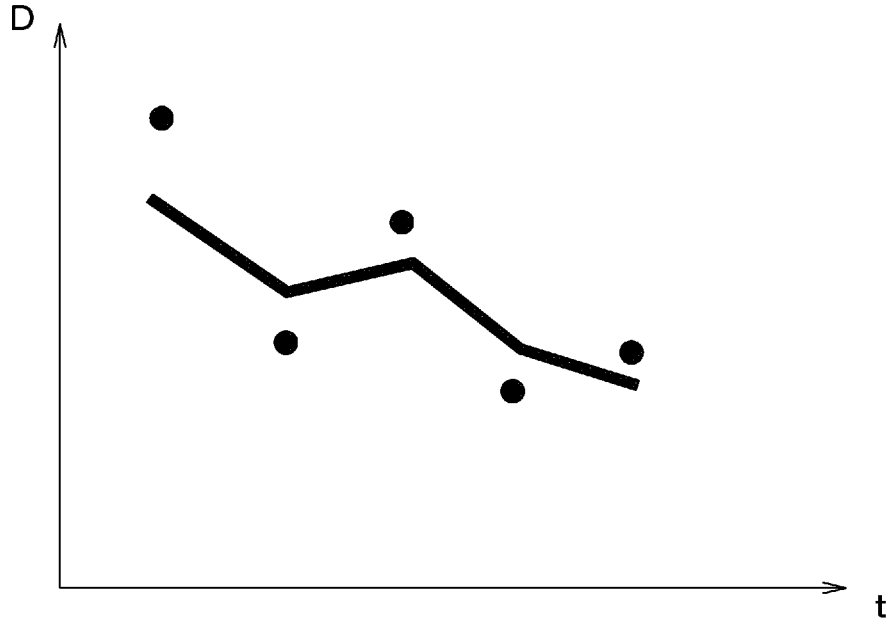

FIG. 6 shows graphs representing a time elapse of the distance information D. In FIG. 6, the upper side graph shows the distance information D without any extraneous noise reception, and the bottom side graph shows the distance information D with extraneous noise reception. The reflected wave of the exploration wave reflected by the object B is received after the elapse of the propagation time, counted from the transmission time of the exploration wave, which corresponds to the distance between the object detection sensor 3 and the object B. On the other hand, extraneous noise is received asynchronously with the transmission time of the exploration wave. Accordingly, when no extraneous noise, a difference between the distance information D and a moving average designated by a straight line in the upper side graph shown in FIG. 6 becomes small. On the other hand, when extraneous noise is received, the difference between the distance information D and the moving average becomes large.

As previously described, it is possible to use a difference of the distance information D from the moving average as a judgment parameter for judging a reception state of extraneous noise. The present embodiment acquires, as the characteristics value, a dispersion of difference of the distance information D from the moving average, or the continuous period of time or a continuous number of times when the dispersion exceeds a predetermined threshold value. The present embodiment uses the judgment threshold value for the high noise state in the forward driving mode, which is greater than the judgment threshold value for the high noise state in the backward driving mode. This provides the same effects of the first embodiment previously described.

Example of Operation

A description will be given of an example of the operation according to the present embodiment with reference to the flow charts shown in FIG. 7 and FIG. 8.

Figure 7:
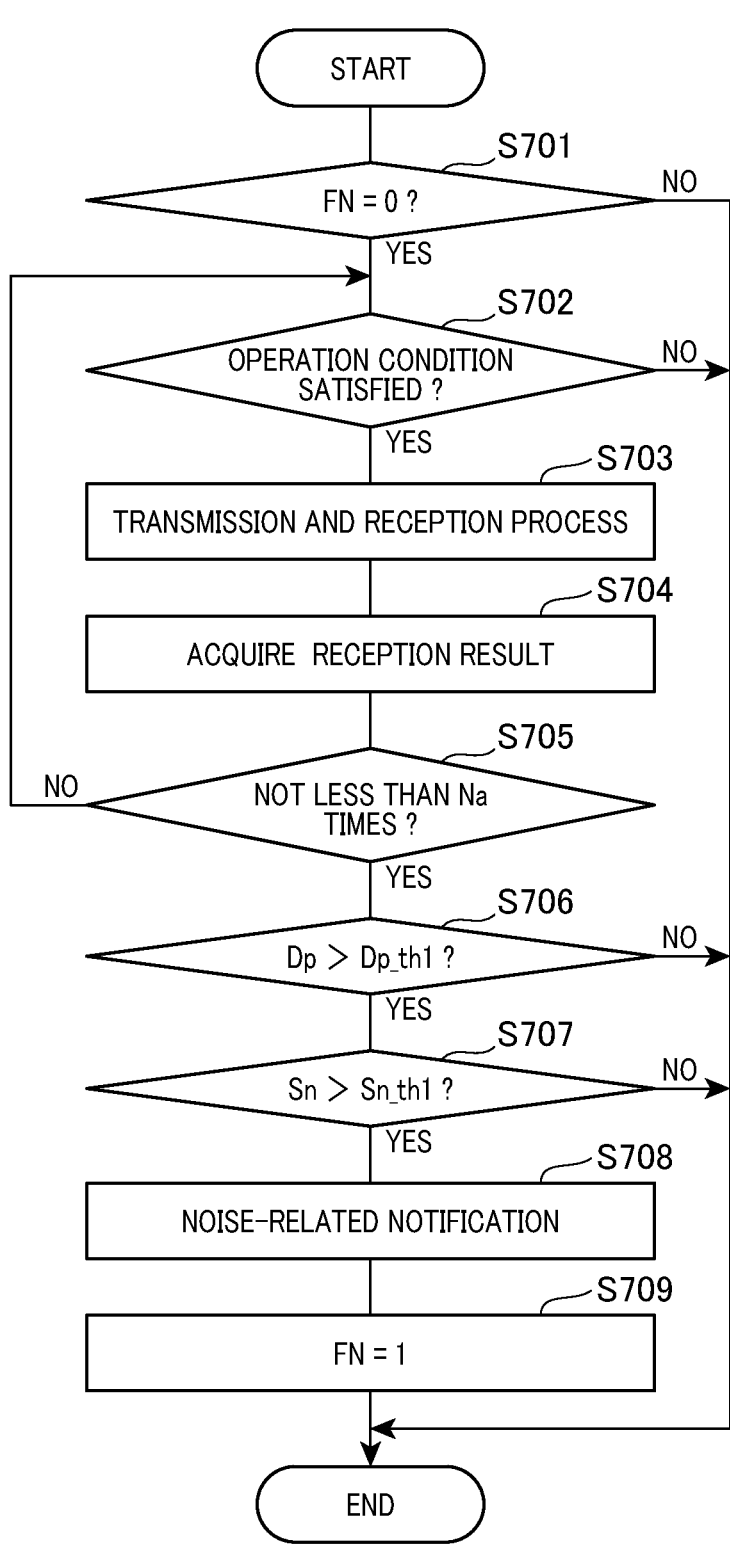
FIG. 7 is a flow chart showing the schematic second operation of the vehicle-mounted system shown in FIG. 1.

The processor 2a reads the programs stored in the memory 2b, which correspond to the routine shown in FIG. 7, and starts to execute the programs at a predetermined timing. The process in step S701 and step S702 is the same as the process in step S401 and step S402 shown in FIG. 4. Accordingly, the explanation of the process in step S701 and step S702 is omitted for brevity.

In step S703, the processor 2a instructs each of the object detection sensors 3 to perform the transmission and reception operation. The present embodiment performs the transmission and reception operation which does not include any noise monitoring process. The present embodiment does not use the noise monitoring period tn of time, that is, does not use the noise monitoring process.

In step S704, the processor 2a acquires, i.e., receives, from each of the plurality of object detection sensor 3, the reception results of the received waves in each of the plurality of object detection sensor 3. Further, the processor 2a calculates characteristics values corresponding to the reception state of extraneous noise, based on the acquired reception results. Specifically, the processor 2a calculates a dispersion Dp of a difference from the moving average of the distance information D. The processor 2a calculates the continuous period of time or continuous number of times when the dispersion Dp exceeds a predetermined dispersion threshold value Dp_th1.

In step S705, the processor 2a executes the transmission and reception process, and acquires the result of the transmission and reception process. That is, the processor 2a judges whether the execution of the transmission and reception process and the acquisition of the result of the transmission and reception process are performed the predetermined number Na of times or more, i.e., judges whether the process in step S703 and the process in step S704 are performed the predetermined number Na of times or more. When the judgment result indicates less than the predetermined number Na of times (NO in step S705), the operation flow returns to step S702. When the judgment result indicates the predetermined number Na of times or more (YES in step S705), the processor 2a advances the operation flow to step S706.

In step S706, the processor 2a judges whether the dispersion Dp exceeds the dispersion threshold value Dp_th1. That is, the processor 2a judges whether the dispersion Dp increases due to the reception of extraneous noise in the transmission and reception process of past Na times. The present embodiment uses different values of the dispersion threshold value Dp_th1 for the forward driving mode and the backward driving mode. Specifically, the present embodiment uses the dispersion threshold value Dp_th1 in the forward driving mode, which is greater than the dispersion threshold value Dp_th1 in the backward driving mode. When the judgment result indicates that the dispersion Dp is less than or equal to the dispersion threshold value Dp_th1 (NO in step S706), the processor 2a temporarily ends this routine without executing the process in step S707 and the processes after step S707. On the other hand, when the detection result indicates that the dispersion Dp exceeds the dispersion threshold value Dp_th1 (YES in step S706), the processor 2a advances the operation flow to step S707.

In step S707, the processor 2a judges whether the continuous characteristics value Sn exceeds the continuous threshold value Sn_th1. That is, the processor 2a judges whether the increase of the dispersion Dp due to the reception of extraneous noise occurs more than a predetermined number of times or is continued more than the predetermined period of time in the transmission and reception process of past Na times. The present embodiment uses different continuous threshold values Sn_th1 in the forward driving mode and the backward driving mode. Specifically, the processor 2a uses the continuous threshold value Sn_th1 for the forward driving mode which is greater than the continuous threshold value Sn_th1 for the backward driving mode.

When the continuous characteristics value Sn is less than or equal to the continuous threshold value Sn_th1 (NO in step S707), the processor 2a advances the operation flow to END, i.e., does not execute step S708 and step S709, and temporarily ends this routine. On the other hand, when the continuous characteristics value Sn exceeds the continuous threshold value Sn_th1 (YES in step S707), the processor 2a executes the process in step S708 and the process in step S709, and then temporarily ends this routine. In step S708, the processor 2a instructs the HMI device 5 to execute the noise-related notification. In step S709, the processor 2a sets the high noise state flag FN (that is, FN=1).

Figure 8:
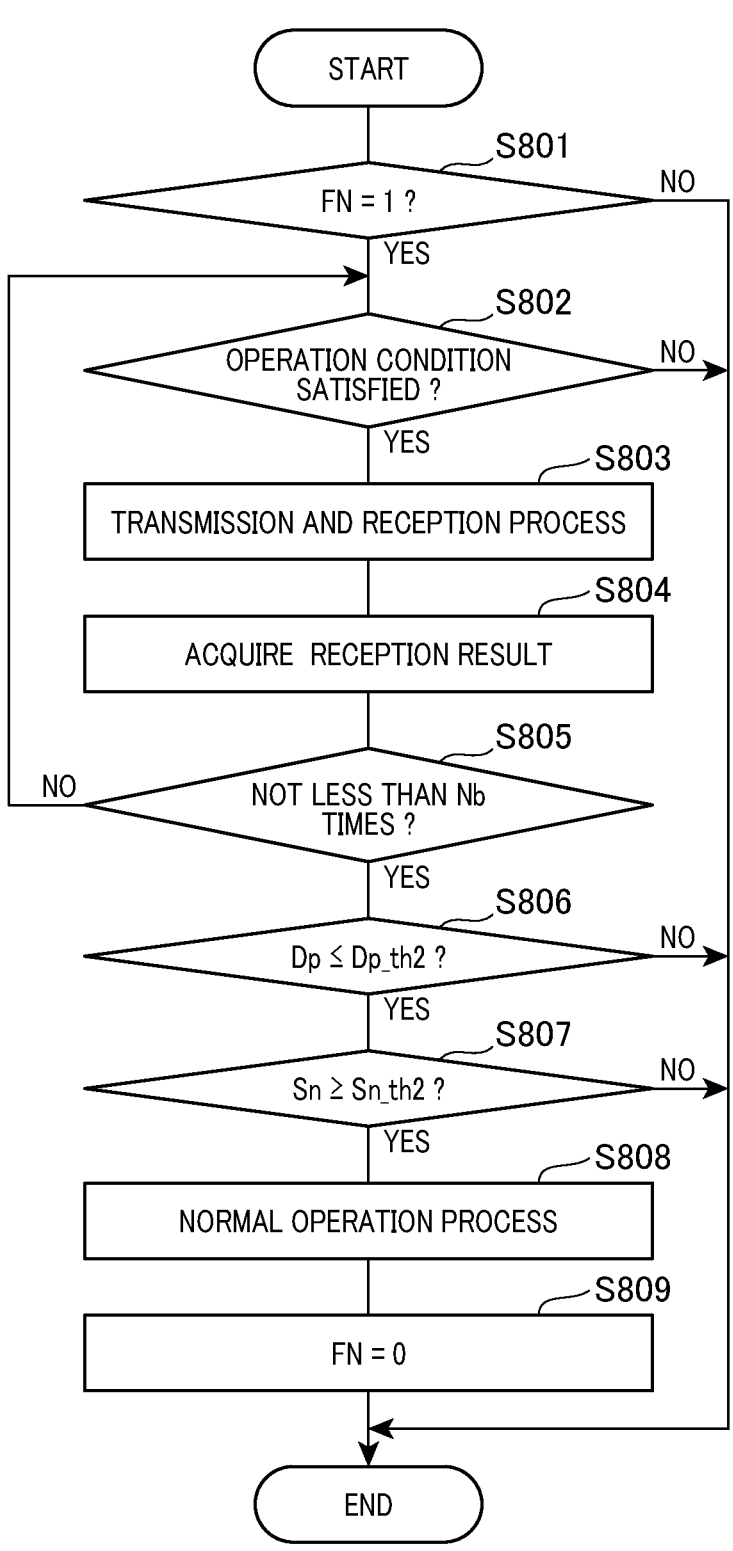
FIG. 8 is another flow chart showing the schematic second operation of the vehicle-mounted system shown in FIG. 1.

The processor 2a reads the programs, stored in the memory 2b, corresponding to the routine shown in FIG. 8, and starts to execute the programs at a predetermined timing. The processes in step S801 and step S802 are the same as the processes in step S501 and step S502 shown in FIG. 5. The processes in step S803 and step S804 are the same as the processes in step S703 and step S704 shown in FIG. 7. The process in step S805 is the same as the process in step S505 shown in FIG. 5. Accordingly, the explanation of the processes from step S801 to step S805 is omitted for brevity.

In step S806, the processor 2a judges whether the dispersion Dp is less than or equal to the dispersion threshold value Dp_th2. The present embodiment uses different values for the dispersion threshold value Dp_th2 for the forward driving mode and the backward driving mode. Specifically, the present embodiment uses the dispersion threshold value Dp_th2 in the forward driving mode which is greater than the dispersion threshold value Dp_th2 in the backward driving mode so as to more rapidly prohibit the execution of the judgment process of the high noise state. When the judgment result indicates that the dispersion Dp exceeds the dispersion threshold value Dp_th2 (NO in step S806), the processor 2a temporarily ends this routine without executing the process in step S807 and the processes in steps after step S807. On the other hand, when the judgment result indicates that the dispersion Dp is less than or equal to the dispersion threshold value Dp_th2 (YES in step S806), the processor 2a advances the operation flow to step S807.

In step S807, the processor 2a judges whether the continuous characteristics value Sn is greater than or equal to the continuous threshold value Sn_th2. In this case, the continuous characteristics value Sn represents the continuous period of time or the continuous number of times when the dispersion Dp is less than or equal to the dispersion threshold value Dp_th2. The present embodiment uses different values of the continuous threshold value Sn_th2 for the forward driving mode and the backward driving mode. Specifically, the processor 2a uses the continuous threshold value Sn_th2 for the forward driving mode which is less than the continuous threshold value Sn_th2 for the backward driving mode so as to more rapidly prohibit the execution of the judgment process of the high noise state.

When the judgment result indicates that the continuous characteristics value Sn is less than the continuous threshold value Sn_th2 (NO in step S807), the processor 2a temporarily ends this routine without execution of the process in step S808 and the processes in steps after step S808. On the other hand, when the judgment result indicates that the continuous characteristics value Sn is greater than or equal to the continuous threshold value Sn_th2 (YES in step S807), the processor 2a executes the process in step S808 and the process in step S809, and then temporarily ends this routine. In step S808, the processor 2a executes the usual operation, that is, operation when it is not high noise state. Specifically, the processor 2a completes the noise-related notification using the HMI device 5, and instructs the HMI device 5 to execute the notification as necessary that the object detection operation can be executed effectively or is being executed effectively. In step S809, the processor 2a resets the high noise state flag FN (that is, FN=0).

Third Embodiment

A description will now be given of the third embodiment. In the third embodiment, the noise processing unit 25 does not execute the noise-related notification when the own vehicle drives in the forward driving mode. On the other hand, the noise processing unit 25 executes the noise-related notification when the own vehicle drives in the backward driving mode. The third embodiment has the same effect as the first embodiment previously described.

Specifically, the present embodiment provides the following process. For example, the noise state acquisition unit 23 does not acquire, that is, does not calculate the characteristics value corresponding to the reception state of extraneous noise when the own vehicle drives in the forward driving mode. Alternatively, for example, the noise state judgment unit 24 does not judge whether the high noise state is satisfied when the own vehicle drives in the forward driving mode. Alternatively, for example, the noise state judgment unit 24 sets, to an adequately high value (for example, FFFF in four hexadecimal digits), the judgment threshold value i.e., the frequency threshold value Rn_th1 and the dispersion threshold value Dp_th1 when the own vehicle drives in the forward driving mode.

Fourth Embodiment

A description will now be given of the fourth embodiment. The first to third embodiments use the different manner for performing the noise judgment of extraneous noise according to the forward driving mode and the backward driving mode so that the noise-related notification is easily provided in the backward riving mode more than in the forward driving mode. On the other hand, in the fourth embodiment, the noise-related notification is more easily performed for the first rear sensor 3E to the fourth rear sensor 3H than for the first front sensor 3A to the fourth front sensor 3D. That is, the first rear sensor 3E to fourth rear sensor 3H are relatively more sensitive in judging the high noise state than the first front sensor 3A to fourth front sensor 3D. The fourth embodiment provides the same effect as the first embodiment previously described.

Specifically, the present embodiment performs the following processes. The front sensor is a general term for the group of the first front sensor 3A to the fourth front sensor 3D. Similarly, the rear sensor is a general term for the first rear sensor 3E to the fourth rear sensor 3H.

For example, the noise state judgment unit 24 uses the judgment threshold value for judging a high noise state for the front sensor higher than that for judging a high noise state for the rear sensor. For example, the judgment threshold value corresponds to the frequency threshold value Rn_th1, the dispersion threshold value Dp_th1 and the continuous threshold value Sn_th1. That is, the fourth embodiment is realized by replacing the forward driving mode with the front sensor and replacing the rear driving mode with the rear sensor in the description of the flowcharts in FIG. 4, FIG. 5, FIG. 7, and FIG. 8.

It is acceptable for the noise processing unit 25 to perform no noise-related notification when the high noise state is established in the front sensor, and to perform the noise-related notification when the high noise state is established in the rear sensor. Specifically, for example, the noise state acquisition unit 23 acquires, that is, calculates no characteristics value of the front sensor corresponding to the noise reception state of extraneous noise. Alternatively, for example, the noise state judgment unit 24 does not judge whether the high noise state is established for the front sensor. Specifically, for example, the noise state judgment unit 24 sets the frequency threshold value Rn_th1 and the dispersion threshold value Dp_th1 to an adequately high value that it cannot normally be exceeded (for example, FFFF in four hexadecimal digits) for the front sensor.

Modifications

The concept of the present disclosure is not limited by the embodiments previously described. It is possible for the present disclosure to have various modifications of the embodiments. A description will now be given of differences between the modifications and the embodiments. The same components between the modifications and the embodiments will be referred to with the same reference number and characters, and the explanation of the same components is omitted here for brevity. Therefore, in the following description of the modification, the description in the above embodiments may be used as appropriate for components having the same reference numerals as those in the above embodiments, unless there is a technical contradiction or special additional explanation.

The concept of the present disclosure is not limited by the specific structure of the embodiments previously described. For example, it is acceptable that three object detection sensors 3 are mounted to the front bumper C2 and three object detection sensors 3 are mounted to the rear bumper C3. Alternatively, for example, it is acceptable that five or more object detection sensors 3 are mounted to the front bumper C2 and/or five or more object detection sensors 3 are mounted to the rear bumper C3.

There is no particular limitation on the specific configuration of the object detection sensor 3 of a transceiver function integrated type. That is, for example, it is acceptable that the object detection sensor 3 may have a configuration in which an ultrasonic wave transmission element and an ultrasonic wave reception element are separately provided in a housing.

It is acceptable for the object detection ECU 2 and a part of the object detection ECU 2 to have a digital circuit, for example, an ASIC and a FPGA, performing the previously described operations. The term ASIC is an abbreviation for an Application Specific Integrated Circuit, and FPGA is an abbreviation for a Field Programmable Gate Array. It is possible to provide the object detection ECU 2 composed of a vehicle-mounted microcomputer and digital circuits.

It is possible to download and upload the programs, capable for performing the various operations, procedures, or processes previously described, through a V2X communication. The term V2X is an abbreviation for a vehicle to X. It is possible to download and upload those programs through a terminal device arranged at manufacturing plants, maintenance shops, distributers, etc. for vehicles C. It is acceptable to store those programs into memory card, optical disk, magnetic disk, etc.

The functional configurations and methods described above may be implemented by a dedicated computer which is provided by configuring a processor and a memory that are programmed to execute one or more embodied functions. Alternatively, the functional configurations and methods described above may be implemented by a dedicated computer which is provided by configuring a processor with one or more dedicated hardware logic circuits. Alternatively, the functional configurations and methods described above may be implemented by one or more dedicated computers which are configured by combining a processor and a memory that are programmed to perform one or more functions, with a processor that is configured by one or more hardware logic circuits. Furthermore, the computer programs may be stored in a computer readable non-transitory tangible recording medium, as instructions to be executed by the computer. That is, in order to realize the functional configurations and methods described above, it is possible to use a computer program including procedures for realizing them and a non-transitory computer-readable storage medium for storing the computer program.

Accordingly, the condition judgment unit 21 to the object detection processing unit 26 shown in FIG. 2 are the functional configuration blocks as an example corresponding to the concept of the present disclosure. Even if these functional configuration blocks are not actually implemented in the object detection ECU 2 as routines or hardware, it is sufficient that the functions or processes specified in the present disclosure are implemented.

The concept of the present disclosure is not limited by the specific operations explained by the embodiments previously described. That is, it is acceptable for the first rear sensor 3E to the fourth rear sensor 3H to perform transmission and reception in the forward driving mode. Similarly, it is acceptable for the first front sensor 3A to the fourth front sensor 3D to perform transmission and reception in the backward driving mode. The concept of the present disclosure can be correctly applied to those cases.

It is possible to eliminate either step S406 or step S407. For example, it is acceptable to perform the process in step S407 when the own vehicle is in the forward driving mode, and to eliminate the process in step S407 when the own vehicle is in the backward driving mode. This control allows the object detection ECU 2 to perform the noise-related notification in the backward driving mode of the own vehicle more easily than in the forward driving mode. The same may be applied to the process in step S706 and the process in step S707.

It is acceptable to use the same value or different values for the frequency threshold value Rn_th2 and the frequency threshold value Rn_th1. Similarly, it is also acceptable to use the same value or different values for the continuous threshold value Sn_th1 and the continuous threshold value Sn_th2. Similarly, it is also acceptable to use the same value or different values for the dispersion threshold value Dp_th1 and the dispersion threshold value Dp_th2.

It is possible to eliminate the overall processes shown in FIG. 5 from the object detection operation. In this case, it is also possible to eliminate the processes in step S401 and step S409 shown in FIG. 4 from the object detection operation. Similarly, it is possible to eliminate the overall processes shown in FIG. 8 from the object detection operation. In this case, it is also possible to eliminate the process in step S701 and the process in step S709 shown in FIG. 7 from the object detection operation.

It is possible to eliminate either step S506 or step S507. For example, it is acceptable to perform the process in step S507 when the own vehicle is in the forward driving mode, and not to eliminate the process in step S507 when the own vehicle is in the backward driving mode. This control allows the object detection ECU 2 to perform the noise-related notification in the backward driving mode of the own vehicle more easily than in the forward driving mode. The same may be applied to the process in step S806 and the process in step S807.

Each of the examples according to the embodiments previously described uses different judgment condition to determine the high noise state for the forward driving mode and the high noise state for the backward driving mode. That is, each of the examples previously described uses the judgment condition, so as to determine the high noise state for the backward driving mode, which is easily satisfied more than the detection condition for the forward driving mode. However, the concept of the present disclosure is not limited by those judgment conditions. For example, it is acceptable for the noise processing unit 25 to perform no noise-related notification even if the judgment condition for the high noise state is satisfied in the forward driving mode. It is also acceptable for the object detection ECU 2 to prohibit the starting of the routine shown in FIG. 4 when the own vehicle is in the forward driving mode.

In the description of the embodiments and modifications previously described, it is acceptable to replace the term "exceed" with the term "greater than or equal to". Similarly, it is also acceptable to replace the terms "less than" with the term "less than or equal to". It is also acceptable to replace the concepts "acquisition", "calculation", "detection", etc., with related terms unless they are inconsistent with each other.

It goes without saying that the elements constituting the above-described embodiments are not necessarily essential, except in cases where they are specifically specified as essential or where they are clearly considered essential in principle. In addition, when numerical values such as the number, amount, range, etc. of a component are mentioned, unless it is clearly stated that it is essential or it is clearly limited to a specific numerical value in principle, this disclosure is not limited to the specific numerical value. Similarly, when the shape, direction, positional relationship, etc. of components, etc. is mentioned, unless it is clearly stated that it is essential, or when it is limited in principle to a specific shape, direction, positional relationship, etc., the present disclosure is not limited to its shape, direction, positional relationship, etc.

Various modifications are not limited by the scope of the embodiments of the present disclosure previously described. For example, it is acceptable to combine the embodiments previously described unless inconsistent with technical meanings in the art. It is acceptable to combine the modifications previously described unless inconsistent with technical meanings in the art. It is further possible to combine the overall or a part of the embodiments and the overall or a part of the modifications previously described unless inconsistent with technical meanings in the art.

What is claimed is:

1. An object detection device configured to detect an object present around an own vehicle using a plurality of object detection sensors mounted to the own vehicle, the plurality of object detection sensors transmitting an exploration wave externally from the own vehicle and receiving a reflected wave of the exploration wave reflected by the object, wherein the object detection device comprises:
   a condition judgment unit configured to judge whether an execution condition for starting an object detection operation is satisfied;
   a noise processing unit configured to perform a noise-related notification corresponding to occurrence of limitation of an object detection function due to a high noise state when the condition judgment unit judges that the execution condition is satisfied and when the high noise state is established, the high noise state being a state in which a reception state of extraneous noise, different from the reflected wave received by the plurality of object detection sensors, exceeds a predetermined judgment criterion;
   a noise state acquisition unit configured to acquire a characteristics value corresponding to the reception state of the extraneous noise; and
   a noise state judgment unit configured to judge that the high noise state is established when the characteristics value exceeds a judgment threshold value corresponding to the predetermined judgment criterion, wherein
the noise state judgment unit is configured to change the judgment threshold value depending on a driving mode of the vehicle, wherein the judgment threshold value for a forward driving mode is higher than the judgment threshold value for a backward driving mode.

2. The object detection device according to claim 1, wherein
the noise processing unit is configured to prohibit the execution of the noise-related notification when the driving mode is the forward driving mode, and allow the execution of the noise-related notification when the driving mode is the backward driving mode.

3. The object detection device according to claim 1, wherein
the noise state acquisition unit is configured to acquire, as the characteristics value, (i) a reception frequency of the extraneous noise or (ii) a first continuous period of time or a first continuous number of times when the reception frequency of the extraneous noise exceeds a predetermined frequency threshold value.

4. The object detection device according to claim 3, wherein
the noise state judgment unit is configured to judge that the high noise state is established, when (i) the reception frequency exceeds the predetermined frequency threshold value and (ii) the first continuous period of time or the first continuous number of times exceeds a predetermined first continuation threshold value, the frequency threshold value is set to a higher value when the driving mode is the forward driving mode than when the driving mode is the backward driving mode, and the first continuation threshold value is set to a higher value when the driving mode is the forward driving mode than when the driving mode is the backward driving mode.

5. The object detection device according to claim 1, wherein the noise state acquisition unit is configured to acquire, as the characteristics value, (i) a propagation time from transmission of the exploration wave to reception of the reflected wave or a dispersion of difference of distance information from a moving average, the distance information being calculated based on the propagation time, or (ii) a second continuous period of time or a second continuous number of times when the dispersion exceeds a predetermined dispersion threshold value.

6. The object detection device according to claim 5, wherein the noise state judgment unit is configured to judge that the high noise state is established, when (i) the dispersion exceeds the predetermined dispersion threshold value and (ii) the second continuous period of time or the second continuous number of times exceeds a predetermined second continuation threshold value, the dispersion threshold value is set to a higher value when the driving mode is the forward driving mode than when the driving mode is the backward driving mode, and the second continuation threshold value is set to a higher value when the driving mode is the forward driving mode than when the driving mode is the backward driving mode.

7. The object detection device according to claim 1, wherein the noise processing unit is configured to perform the noise-related notification using a human machine interface (HMI) device as a display device and/or an audio output device mounted to the own vehicle.

8. An object detection device configured to detect an object present around an own vehicle using a plurality of object detection sensors mounted to the own vehicle, the plurality of object detection sensors transmitting an exploration wave externally from the own vehicle and receiving a reflected wave of the exploration wave reflected by the object, wherein the object detection device comprises:

a condition judgment unit configured to judge whether an execution condition for starting an object detection operation is satisfied;

a noise processing unit configured to perform a noise-related notification corresponding to occurrence of limitation of an object detection function due to a high noise state when the condition judgment unit judges that the execution condition is satisfied and when the high noise state is established, the high noise state being a state in which a reception state of extraneous noise, different from the reflected wave received by the plurality of object detection sensors, exceeds a predetermined judgment criterion, and wherein the plurality of object detection sensors includes a front sensor mounted to a front of the own vehicle and a rear sensor mounted to a rear of the own vehicle;

a noise state acquisition unit configured to acquire a characteristics value corresponding to the reception state of the extraneous noise; and a noise state judgment unit configured to judge that the high noise state is established when the characteristics value exceeds a judgment threshold value corresponding to the predetermined judgment criterion, wherein the noise state judgment unit is configured to change the judgment threshold value depending on whether the high noise state is established for the front sensor or the rear sensor, the judgment threshold value when judging that the high noise state is established for the front sensor is higher than the judgment threshold value when judging that the high noise state is established for the rear sensor.

9. The object detection device according to claim 8, wherein the noise processing unit is configured to prohibit the execution of the noise-related notification when the high noise state is established in the front sensor, and allow the execution of the noise-related notification when the high noise state is established in the rear sensor.

10. The object detection device according to claim 8, wherein the noise state acquisition unit is configured to acquire, as the characteristics value, (i) a reception frequency of the extraneous noise or (ii) a continuous period of time or a continuous number of times when the reception frequency of the extraneous noise exceeds a predetermined frequency threshold value.

11. The object detection device according to claim 8, wherein the noise state acquisition unit is configured to acquire, as the characteristics value, (i) a propagation time from transmission of the exploration wave to reception of the reflected wave or a dispersion of difference of distance information from a moving average, the distance information being calculated based on the propagation time, or (ii) a continuous period of time or a continuous number of times when the dispersion exceeds a predetermined dispersion threshold value.

12. The object detection device according to claim 8, wherein the noise processing unit is configured to perform the noise-related notification using a human machine interface (HMI) device as a display device and/or an audio output device mounted to the own vehicle.

13. An object detection method of detecting an object present around an own vehicle using a plurality of object detection sensors mounted to the own vehicle, each of the plurality of object detection sensors transmitting an exploration wave externally from the own vehicle and receiving a reflected wave of the exploration wave reflected by the object, wherein the method comprises steps of:

judging whether an execution condition for starting an object detection operation is satisfied;

performing a noise-related notification corresponding to occurrence of limitation of an object detection function due to a high noise state when judging that the execution condition is satisfied and when the high noise state is established, the high noise state being a state in which a reception state of extraneous noise, different from the reflected wave received by the plurality of object detection sensors, exceeds a predetermined judgment criterion;

acquiring a characteristics value corresponding to the reception state of the extraneous noise; and judging that the high noise state is established when the characteristics value exceeds a judgment threshold value corresponding to the predetermined judgment criterion, wherein the judgment threshold value is set depending on a driving mode of the vehicle, wherein the judgment threshold value for a forward driving mode is higher than the judgment threshold value for a backward driving mode.

14. An object detection method of detecting an object present around an own vehicle using a plurality of object detection sensors mounted to the own vehicle, the plurality of object detection sensors transmitting an exploration wave externally from the own vehicle and receiving a reflected wave of the exploration wave reflected by the object, wherein the method comprises steps of:

judging whether an execution condition for starting an object detection operation is satisfied;

performing a noise-related notification corresponding to occurrence of limitation of an object detection function due to a high noise state when judging that the execution condition is satisfied and when the high noise state is established, the high noise state being a state in which a reception state of extraneous noise, different from the reflected wave received by the plurality of object detection sensors, exceeds a predetermined judgment criterion, wherein the plurality of object detection sensors including a front sensor mounted to a front of the own vehicle and a rear sensor mounted to a rear of the own vehicle;

acquiring a characteristics value corresponding to the reception state of the extraneous noise; and judging that the high noise state is established when the characteristics value exceeds a judgment threshold value corresponding to the predetermined judgment criterion, wherein the judgment threshold value is set depending on whether the high noise state is established for the front sensor or the rear sensor, wherein the judgment threshold value when judging that the high noise state is established for the front sensor is higher than the judgment threshold value when judging that the high noise state is established for the rear sensor.

15. A non-transitory computer-readable storage medium storing an object detection program executed by an object detection device, the object detection device detecting an object present around an own vehicle using a plurality of object detection sensors mounted to the own vehicle, each of the plurality of object detection sensors transmitting an exploration wave externally from the own vehicle and receiving a reflected wave of the exploration wave reflected by the object, wherein the process executes steps of:

judging whether an execution condition for starting an object detection operation is satisfied; and performing a noise-related notification corresponding to occurrence of limitation of an object detection function due to a high noise state when judging that the execution condition is satisfied, and when the high noise state is established, the high noise state being a state in which a reception state of extraneous noise, different from the reflected wave received by the plurality of object detection sensors, exceeds a predetermined judgment criterion;

acquiring a characteristics value corresponding to the reception state of the extraneous noise; and judging that the high noise state is established when the characteristics value exceeds a judgment threshold value corresponding to the predetermined judgment criterion, wherein the judgment threshold value is set depending on a driving mode of the vehicle, wherein the judgment threshold value for a forward driving mode is higher than the judgment threshold value for a backward driving mode.

16. A non-transitory computer-readable storage medium storing an object detection program executed by an object detection device, the object detection device detecting an object present around an own vehicle using a plurality of object detection sensors mounted to the own vehicle, the plurality of object detection sensors transmitting an exploration wave externally from the own vehicle and receiving a reflected wave of the exploration wave reflected by the object, wherein the program executes steps of:

judging whether an execution condition for starting an object detection operation is satisfied; and performing a noise-related notification corresponding to occurrence of limitation of an object detection function due to a high noise state when judging that the execution condition is satisfied and when the high noise state is established, the high noise state being a state in which a reception state of extraneous noise, different from the reflected wave received by the plurality of object detection sensors, exceeds a predetermined judgment criterion, wherein the plurality of object detection sensors including a front sensor mounted to a front of the own vehicle and a rear sensor mounted to a rear of the own vehicle;

acquiring a characteristics value corresponding to the reception state of the extraneous noise; and judging that the high noise state is established when the characteristics value exceeds a judgment threshold value corresponding to the predetermined judgment criterion, wherein the judgment threshold value is set depending on whether the high noise state is established for the front sensor or the rear sensor, wherein the judgment threshold value when judging that the high noise state is established for the front sensor is higher than the judgment threshold value when judging that the high noise state is established for the rear sensor.

* * * * *